Aug. 25, 1953     H. D. FOWLER     2,650,049
TRANSPORT AIRPLANE CONSTRUCTION
Filed June 20, 1949     6 Sheets-Sheet 2
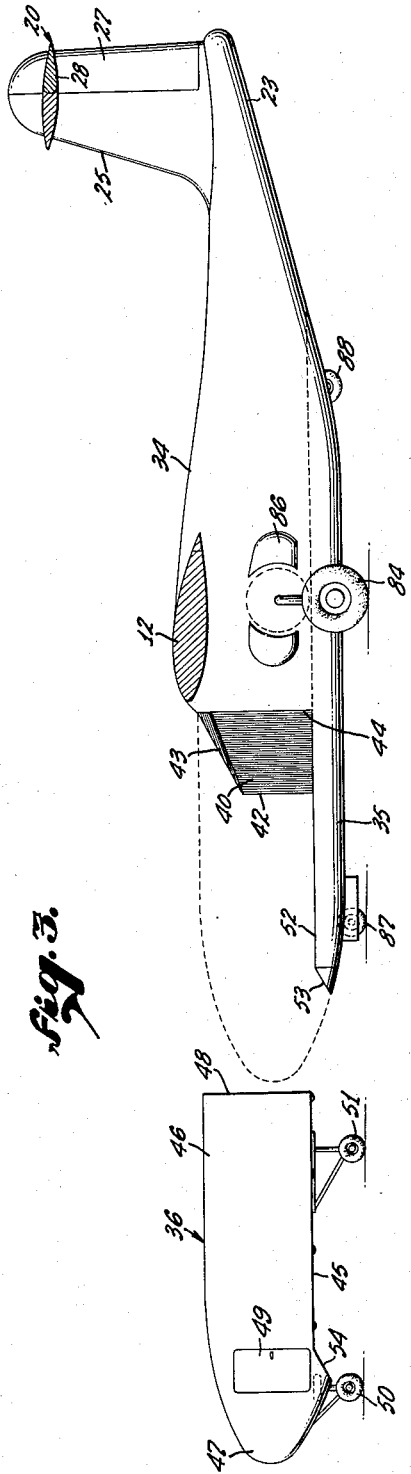
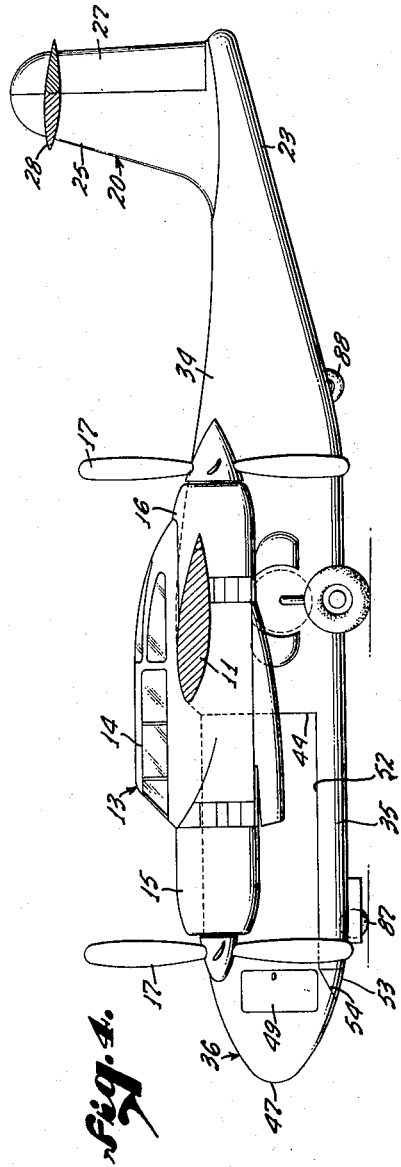
HARLAN D. FOWLER,
INVENTOR.
HUEBNER, BEEHLER, WORREL,
HERZIG & CALDWELL,
ATTORNEYS.
BY Aug. 25, 1953     H. D. FOWLER     2,650,049
TRANSPORT AIRPLANE CONSTRUCTION
Filed June 20, 1949     6 Sheets-Sheet 3
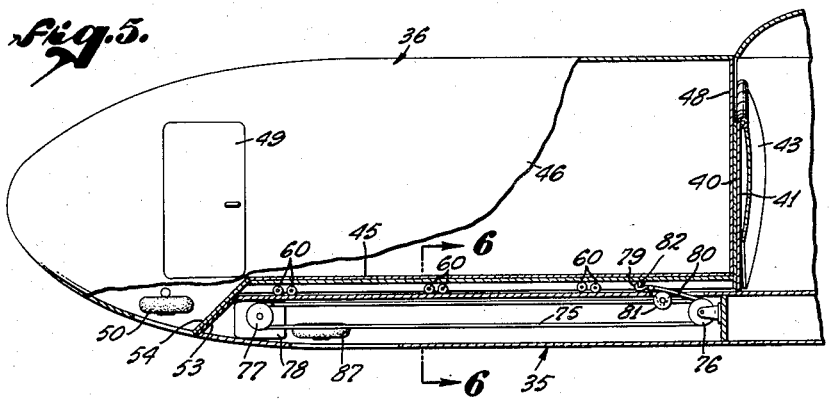
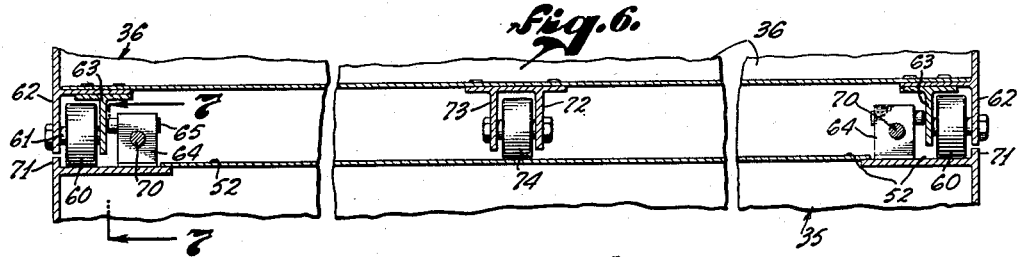
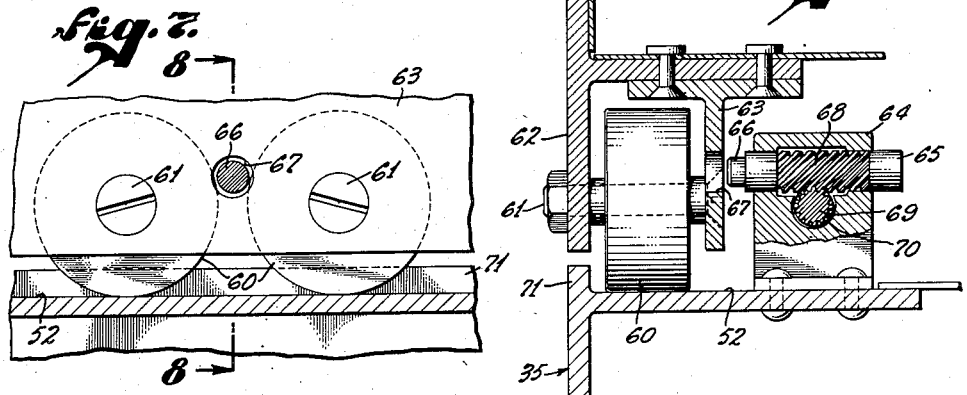
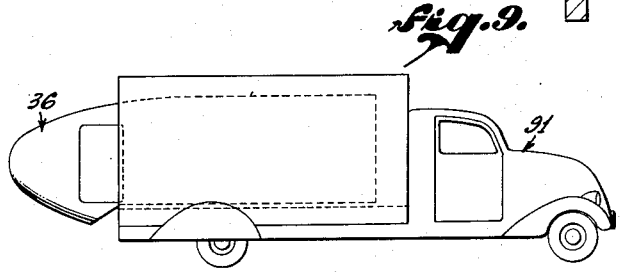
HARLAN D. FOWLER,
INVENTOR.
HUEBNER, BEEHLER, WORREL,
HERZIG & CALDWELL,
ATTORNEYS.

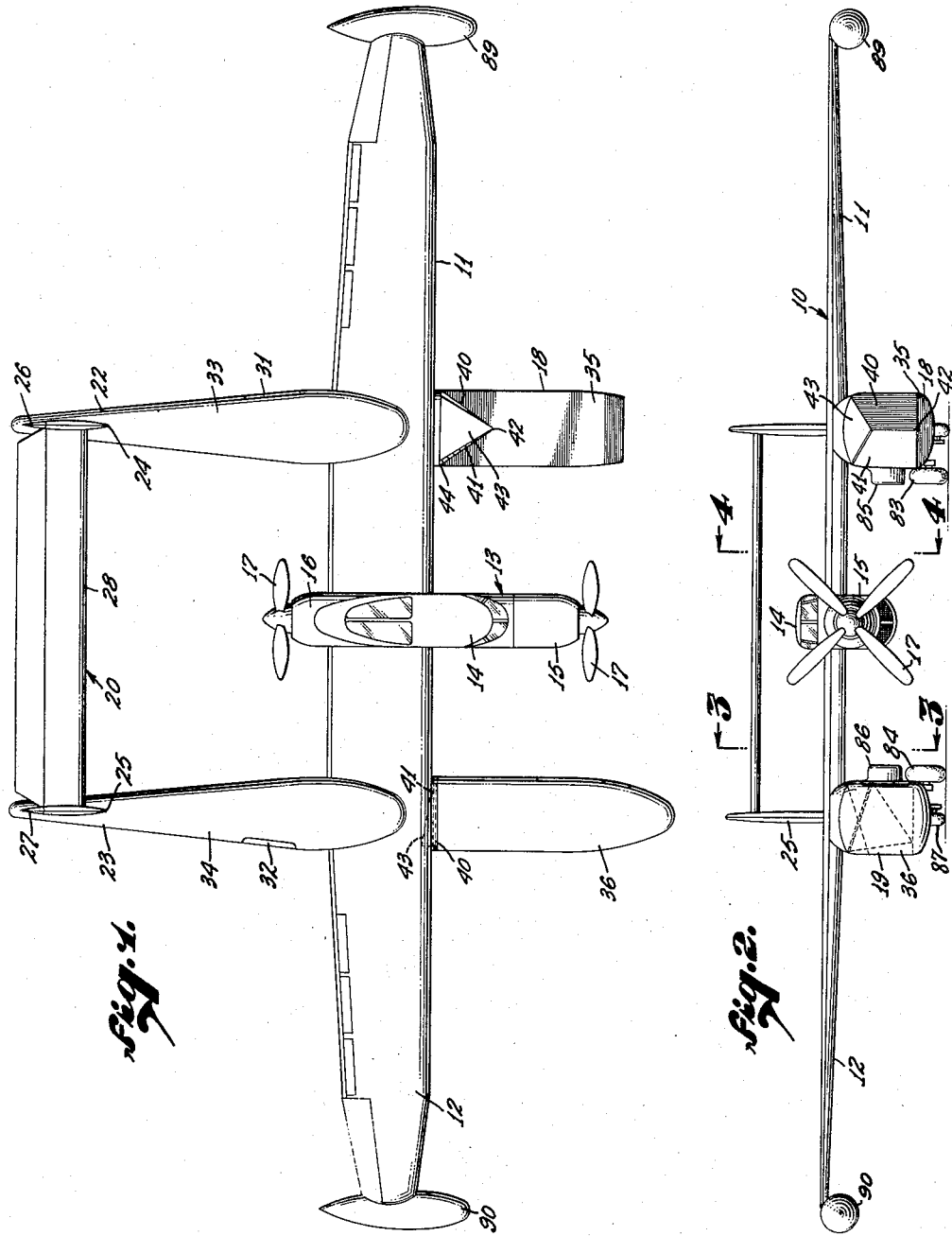

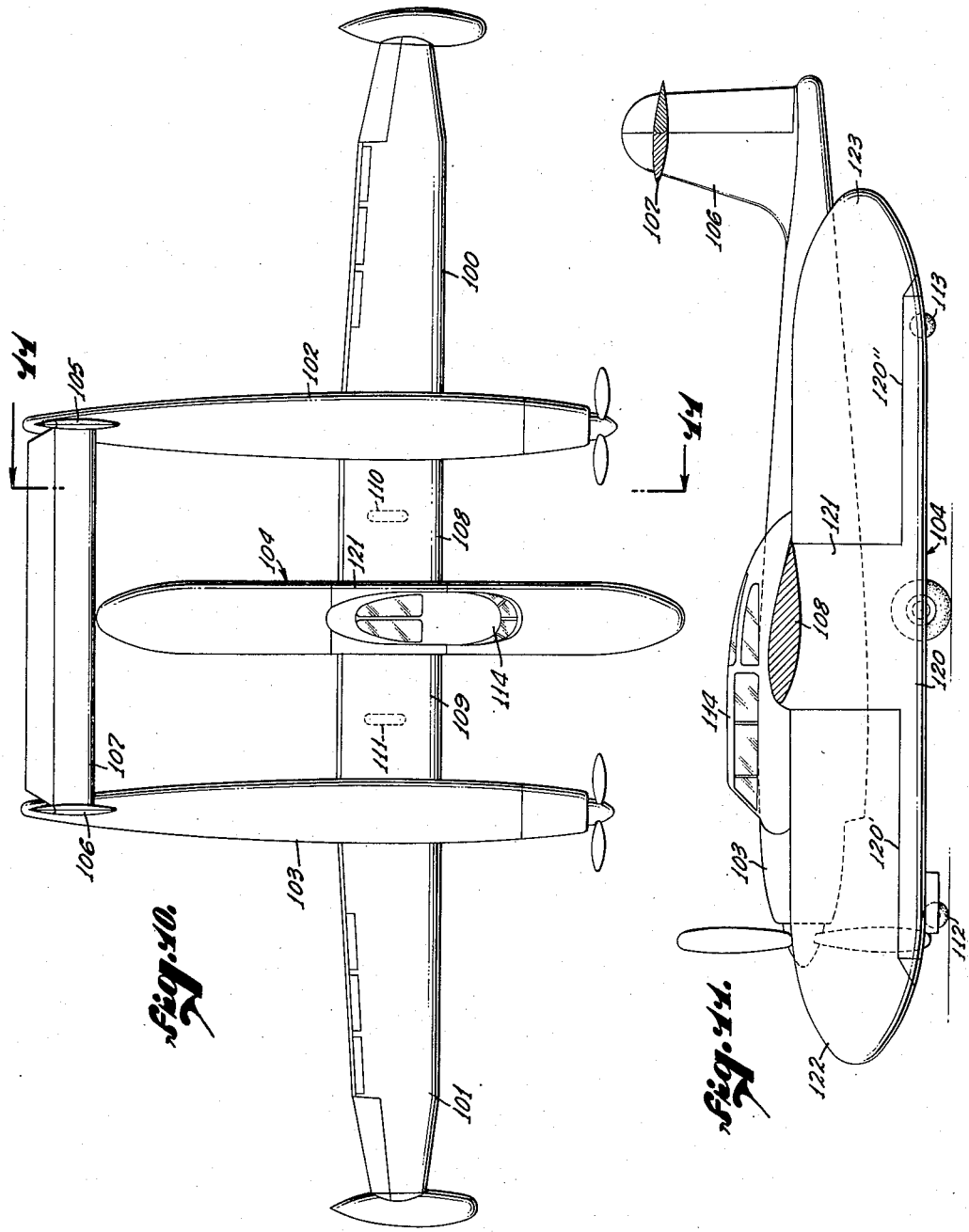

Aug. 25, 1953  H. D. FOWLER  2,650,049
TRANSPORT AIRPLANE CONSTRUCTION
Filed June 20, 1949  6 Sheets-Sheet 5
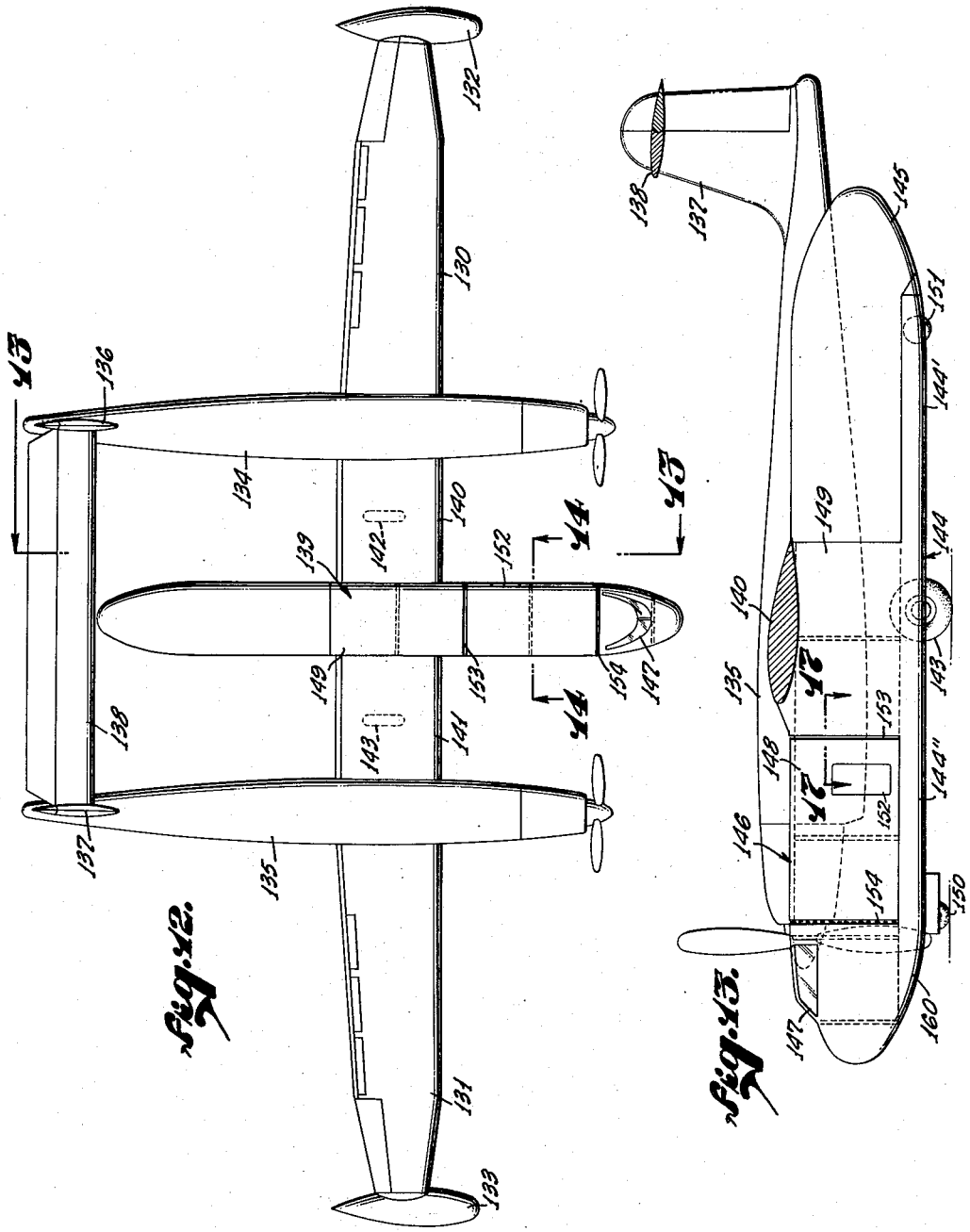
HARLAN D. FOWLER,
INVENTOR.
HUEBNER, BEEHLER, WORREL,
HERZIG & CALDWELL,
ATTORNEYS.
BY

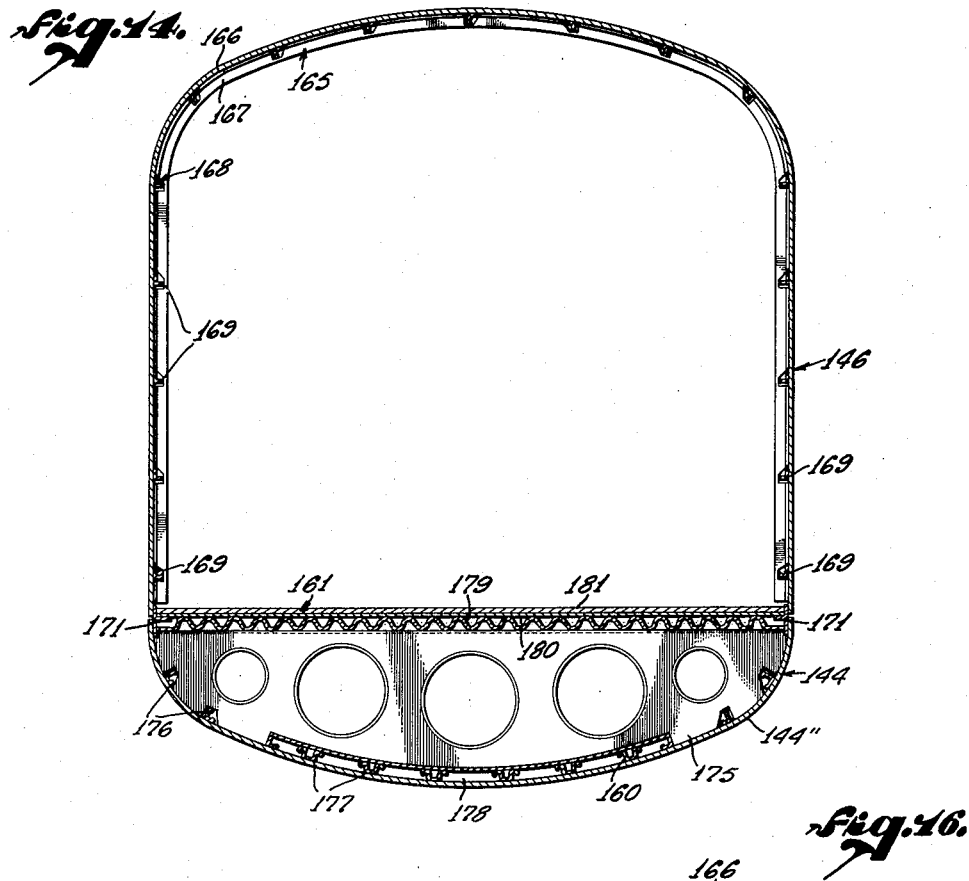
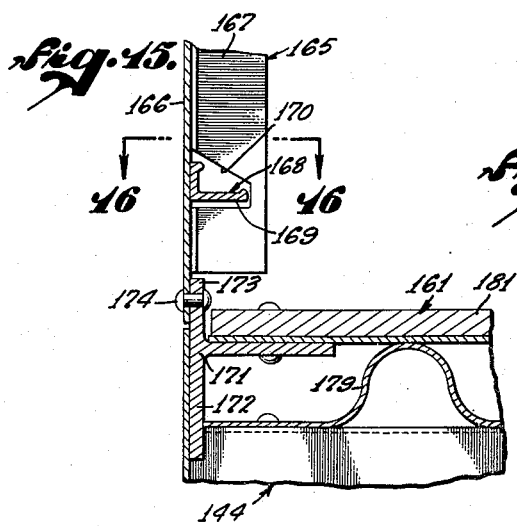
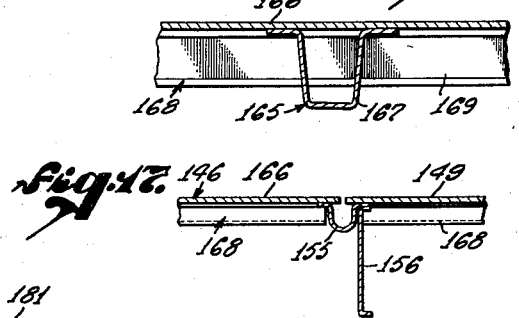
Aug. 25, 1953  H. D. FOWLER  2,650,049
TRANSPORT AIRPLANE CONSTRUCTION
Filed June 20, 1949  6 Sheets—Sheet 6
HARLAN D. FOWLER,
INVENTOR.
HUEBNER, BEEHLER, WORREL,
HERZIG & CALDWELL,
ATTORNEYS.
BY

Patented Aug. 25, 1953

2,650,049

UNITED STATES PATENT OFFICE 2,650,049

TRANSPORT AIRPLANE CONSTRUCTION

Harlan D. Fowler, Whittier, Calif.

Application June 20, 1949, Serial No. 100,165

15 Claims. (Cl. 244—118)

The invention relates to aircraft and has particular relation to airplanes designed especially as cargo transports where the unit concentration of loads carried by the fuselage may be in excess of that heretofore considered normal. Although the aircraft herein disclosed has special advantages for the transportation of cargo because of the heavy concentration of weight per unit area, nevertheless the design involved in meeting this need has certain advantages of a general sort.

In the design of aircraft heretofore considered somewhat standard and conventional the fuselage in its entirety has been so calculated that all parts, including the rib frames, stringers and skin, combine to supply the necessary resistance to stress and to the support of whatever load may be carried by the plane. To this end the thickness and strength of the skin, for example, has been so calculated as to provide the greatest strength commensurate with lightness in weight.

In aircraft ordinarily designed for the transportation of persons the load per square foot of floor area occupied has been relatively light. This is so for the reason that when persons are carried within the fuselage a rather substantial cubic area is needed for their accommodation which results in a relatively light load on the floor. When such planes are used instead for cargo because of the fact that cargo can be packed more densely, there may readily result a far greater load per square foot of floor area. Consequently, even though the plane is sufficiently powerful to lift and transport the load, nevertheless the floor deck must be made heavy enough to accommodate the increased load concentration when used to transport cargo. Because of this circumstance a re-design of the floor or deck for the support of cargo becomes mandatory.

In another respect also transport planes heretofore utilized for the transportation of cargo have had a considerable lack of versatility resulting in a relatively great loss of time in the transfer of cargo onto and off the plane. Where bulk cargo has been accommodated special handling devices have been necessary wherever any reduction in time over hand-loading has been accomplished. The fact that fuselages of fixed form and configuration have been maintained has made the rapid loading and unloading of cargo an extremely difficult task.

Although some designs for aircraft have been advanced which have had for their aim an airplane adapted to the employment of preloaded cargo containers, even here the design of such planes has followed conventional design to such an extent that complete ease in loading and unloading has never been accomplished.

In addition to the actual movements of cargo containers onto and off such transport planes, there is the accompanying problem of delivering cargo to the airport by such means of transportation as are currently available with sufficient rapidity, economy and convenience to make possible the advantageous transportation of that cargo from one airport to another. While this necessity exists to some extent for commercial operation, it exists to a far greater extent from the point of view of military transportation.

It is therefore among the objects of the invention to provide a new and improved design for such transports which is adapted to make possible particularly rapid handling of cargo, taking into consideration both the delivery of cargo to the airport and the loading and unloading of cargo upon the plane.

Another object of the invention is to provide a new and improved design of transports which is especially well adapted to the transportation of loads where the concentration of weight may be exceptionally great upon the deck or platform supporting the load.

Still another object of the invention is to provide a new and improved transport type aircraft wherein the fuselage designed for load carrying may take the form of a platform structurally complete in itself and upon which may be applied where occasions demand a suitable shelter or canopy over the platform in order to protect the load from the elements.

Another object of the invention is to provide a new and improved transport type aircraft which is adapted to the rapid loading and unloading of cargo but wherein the pilot compartment and engines are sufficiently removed from the cargo area so as not to interfere with the loading and unloading operations on the ground and which also, when the plane is aloft, are safely removed from the portions occupied by the cargo so that a possible inadvertent shift in any portion of the cargo will in no way endanger the safety of the plane either by encroaching upon the motive power or the control operations of the plane lodged in the pilot compartment.

Still further among the objects of the invention is to provide a new and improved transport type aircraft with the fuselage so constructed that it can accommodate loads of great concentration of weight per unit area on the floor or deck, which is particularly well adapted to the accommodation of preloaded cargo pods, containers or shelters of such dimension and configuration that the pods, containers or shelters may be moved about the field approaching or leaving the aircraft upon a roller or other support incorporated in them and which further are adapted to be transported to and from the airport either upon their own rolling supports or in trucks, vans or trailers of conventional types.

It will be understood further that it is among the objects of the invention to so improve the construction of cargo airplanes that the platform which supports the weight of the cargo is so ruggedly constructed that it is capable of taking all of the stress customarily absorbed by the fuselage either in flight or on the ground, thereby making it possible to use a canopy or shelter of the lightest possible construction which need have no greater stiffness than that needed to resist ordinary wind forces to the extent that the combined weight of the platform and the canopy is substantially less than that of a monocoque type cargo floor arrangement and fuselage which it replaces. This advantage remains even though the canopy or shelter is in the form of removable cargo pods or containers. By the construction thus proposed there is made possible the use of ordinary automotive equipment such as jeeps, cranes, tractors, etc., having their own traction power by which they can be driven up a ramp onto the cargo platform there to be anchored for flight either within a bulk cargo shelter or elsewhere on the deck.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a plan view of one form of the invention showing a transport aircraft incorporating twin fuselage sections one of which is illustrated as being loaded with a preload cargo pod and the other of which is illustrated as being unloaded but arranged in such a manner that the plane is ready for flight.

Figure 2 is a front elevational view of the aircraft shown in Figure 1.

Figure 3 is a side view partially in section of the aircraft shown in Figures 1 and 2, showing a removable cargo pod ready for loading upon the plane, taken on the line 3—3 of Figure 2.

Figure 4 is a side view partially in section taken on the line 4—4 of Figure 2, but showing the pod removed and doors adjusted for flight.

Figure 5 is a fragmentary longitudinal sectional view showing the construction of a platform of the type used on the twin fueslage sections of the aircraft shown in Figure 1.

Figure 6 is a partial cross-sectional view taken on the line 6—6 of Figure 5.

Figure 7 is a fragmentary longitudinal sectional view taken on the line 7—7 of Figure 6 showing a rolling support.

Figure 8 is a fragmentary cross-sectional view taken on the line 8—8 of Figure 7, showing one form of locking device.

Figure 9 is a side elevational view to small scale illustrating one means by which a removable cargo pod can be transported to and from the airport.

Figure 10 is a plan view of a second form of the invention showing twin fuselage sections for motive power and a central fuselage for cargo.

Figure 11 is a longitudinal sectional view taken on the line 11—11 of Figure 10.

Figure 12 is a plan view of still a third form of the invention.

Figure 13 is a longitudinal sectional view taken on the line 13—13 of Figure 12.

Figure 14 is a cross-sectional view drawn to a larger scale showing the construction of the fore part of the load-carrying fuselage of the aircraft of Figure 12.

Figure 15 is a fragmentary cross-sectional view showing in detail the means of attachment of a shelter for the cargo to a platform-like fuselage.

Figure 16 is a fragmentary sectional view of a portion of the shelter taken on the line 16—16 of Figure 15.

Figure 17 is a fragmentary sectional view taken on the line 17—17 of Figure 13.

In the first embodiment chosen for the purpose of illustrating the invention herein disclosed there is shown a plane in this instance particularly adapted to the transportation of cargo. In the form presented for disclosure the plane consists of a single wing section 10 showing one part 11 at the right-hand side as viewed in Figures 1 and 2 and another part 12 on the left-hand side. Centrally located is what may be designated as a central fuselage section 13 more specifically termed a nacelle which is adapted to include a pilot cabin 14 having a cockpit and fore and aft engine compartments 15 and 16, respectively. These last identified parts are best shown in Figure 4. The engines housed in the engine compartments are illustrated as being equipped with conventional four-blade propellers 17, one rotated for pulling and the other rotated for pushing the aircraft.

In the embodiment illustrated in Figures 1, 2, 3, and 4 the cargo-carrying portion of the plane consists of twin lateral fuselage sections, namely, a fuselage section 18 on the right and 19 on the left as viewed in Figures 1 and 2. These fuselage sections are similar in all respects and balanced equidistant on opposite sides of the central fuselage or nacelle section but at a distance substantially removed therefrom.

As may readily be observed from the figures referred to, there is provided a tail structure or empennage indicated generally by the reference character 20. Located respectively at tail portions 22 and 23 of the lateral fuselage sections are tail structures or fins 24 and 25 to which are attached conventional rudders 26 and 27. A horizontal stabilizer and elevator structure 28 interconnects the tail structures 24 and 25.

The lateral fuselage sections are for all practical purposes duplicates of each other except for the location of doors 31 and 32 giving access to bulk cargo compartments 33 and 34, respectively, on the right and left-hand fuselage sections. The forward portion of each lateral fuselage section consists primarily of a platform 35, only one of which will be described in detail inasmuch as the platform is the same on each of the lateral fuselage sections. The platform is so constructed that there can be mounted upon the platform a removable cargo pod or container 36, but the plane is so constructed and balanced that, as illustrated in Figure 1, the plane can be flown when there is a cargo pod 36 on only one of the platforms, the other platform remaining empty. It will be obvious that the plane is also adapted to fly when provided with removable cargo pods mounted on both platforms or with both platforms empty when occasion may require.

In order that the plane may be flown with reasonable efficiency without the presence of a cargo pod, there are provided lateral doors 40 and 41 which extend together at a point 42, these doors being covered by a hatch 43 in flight. Anchored in this position the doors have the effect of streamlining a wall at the rear 44 of the platform 35 in order to cut down wind resistance.

When the platform is to have mounted thereon one of the removable cargo pods 36, the doors 40 and 41 and the hatch 43 may be folded one upon another, as illustrated by the dotted lines on the left-hand side of Figures 1 and 2, so that a flat wall is presented to the end of the removable cargo pod.

As best viewed in Figure 3 the cargo pod 36 includes a floor 45, a cover portion 46, a rounded nose 47 and a rear door 48. A door 49 gives access to the interior, although cargo may be more conveniently loaded directly through the door 48. For convenience the cargo pod may be equipped with retractable fore and aft rolling supports 50 and 51 upon which the pod may be moved over the ground. The retractable supports are preferably made so as to carry the pod at an elevation such that the floor 45 is at substantially the elevation of the top surface 52 of the platform 35.

It will be noted as a matter of convenience that the forward end of the platform 35 has a downwardly pitched portion 53 against which an oblique shoulder 54 on the bottom of the pod may rest.

In order to more readily support the pod upon the upper surface of the platform 35, each pod may be provided with a series of three aligned rollers, one at the center and one at each side, as best viewed in Figure 6 by way of example. The rolling support thus suggested may take any one of a number of forms, having in mind an efficient means of sliding the pod endwise into position upon the platform.

As an example of an acceptable device there is illustrated in Figures 5, 6, 7 and 8 roller devices for the purpose defined. The roller devices are here illustrated as consisting of rollers or casters 60 arranged in pairs and each carried by an axle 61. An outside flange 62 supports one side of the axle and a web 63 of a T-section supports the other end of the axle.

The rollers along each outer edge, mounted in pairs, included a locking device for anchoring the rollers, and hence the removable pod, in position on the platform. One successful means for locking the rollers, and hence the removable pod, in place is embodied in a block 64 located inside the roller and adjacent the web 63 of the T-section. Transversely disposed in the block is a pin 65, an end 66 of reduced size being adapted to enter an aperture 67 in the web 63 of the T-section at substantially the bottom of the V-like space between the rollers 60, as is more readily apparent from an examination of Figure 7. The pin may be moved by having provided thereon a steep worm groove 68 adapted to mesh with a gear 69 on a shaft 70. Each set of rollers is preferably provided with one of the locking devices described with all of the locking devices on one side of the platform operated by the common shaft 70 running the full length of the platform on each side and operated by a conventional mechanism not specifically a part of this invention, details of which have been omitted. By providing apertures 67 of large enough diameter to give ample clearance for each respective pin when all of the pins on both sides of the platform have been driven into place, the clearance thus provided will be taken up and the pod locked against both lifting and shifting.

To further improve the safety of the locking device the platform 35 may include flanges 71 raised above the contact of the roller 60 with the upper surface 52 of the paltform.

A section extending longitudinally throughout the length of the floor of the pod having webs 72 and 73 may be utilized to mount either single or double rollers 74 in order to support the center of the pod upon the center of the platform.

For drawing the pod onto the platform or removing it therefrom there is here shown an endless chain 75 reaved around sprockets 76 and 77, the sprocket 77 being operated by a power device 78. A hook 79 attached to the chain by means of an extension 80 and rolling over an idler pulley 81 is adapted to engage a ring 82 on the pod as a means for pulling the pod from the removed position shown in Figure 1 to the mounted position shown in Figure 5. To reverse the operation it is necessary only to reverse the direction of the motion of the endless chain 75 and to engage the hook 79 with the ring 82 in order that the pod may be pulled clear of its position on the platform.

To assure the success of this mounting and removal, it may be borne in mind that the rollers or wheels 51 may be removed or retracted after the end 48 engages the platform and the rollers or wheels 50 are permitted to roll over the surface of the ground until the pod is mounted after which the latter wheels may also be retracted. In removing the pod the rollers or wheels 50 may be lowered first and the rollers 51 placed in position after the pod has almost cleared the platform.

As further illustrated in the drawings the right and left fuselage sections may be equipped with landing wheels 83 and 84, respectively, adapted to be retracted into respective housings 85 and 86 in flight. A front wheel 87 is also provided together with a tail wheel 88 for assistance in landing and taking off as well as in balancing the plane upon the ground.

As shown in the embodiment just described the platforms 35 are located forward of the wing section. These are sufficiently removed from the area of rotation of the propellers 17 and the space occupied by the central fuselage or nacelle that both platforms may be readily loaded and unloaded without the efficiency of the operation being impaired by too close a proximity to the propellers. The cargo-carrying efficiency of the plane is still further enhanced by the provision of bulk cargo spaces 33 and 34 aft of the wing to which access is had by means of doors 31 and 32. Cargo space is further enhanced by the provision of fuel tanks 89 and 90 on the right and left hands of the wing, respectively.

For transportation of cargo to and from the airport the cargo pods 36 may be used as trailers running on their own wheel or roller supports or they may, if preferred, be carried in a van or truck 91, as represented in Figure 9. It is contemplated that for efficient over-all operation the cargo pods should be designed to such a dimension that they are capable of fitting within large trucks or vans of conventional dimensions with respect to the width and height of the interior of the truck or van bodies. To this end all pods can be precisely the same in dimension and outline so that they are interchangeable from one side to the other of the lateral fuselage sections as well as being adapted for transport over the highways to and from the airport, thus permitting loading of the pods in the most convenient locality.

It will also appear that the plane as described is one exceptionally safe in design to the extent that neither the pilot nor the engine is so located as likely to be damaged by a shift of the cargo in flight. This element of safety and convenience is in addition to removal of the location of the pilot and engine from the cargo-carrying portions of the plane in the interest of efficient loading and unloading.

In another embodiment of the invention illustrated in Figures 10 and 11 certain features of the design are still more readily apparent. In the embodiment illustrated in Figures 10 and 11 a plane is shown as one wherein a wing section includes right and left extensions 100 and 101, right and left engine fuselage sections 102 and 103, respectively, or more specifically nacelle tail boom sections on opposite sides of a central fuselage section 104. The engine fuselage sections have tail structures 105 and 106 connected together by a horizontal tail 107. Portions 108 and 109 of the wing are shown intermediate the respective engine fuselages and the central fuselage. Moreover, in this embodiment of the invention it has been found better practice to locate landing wheels 110 and 111 under the wing portions 108 and 109 spaced some distance laterally from the central fuselage section 104 for greater stability. A nose wheel 112 is useful in balancing the plane on the ground and a tail wheel 113 is of assistance in landings and take-offs.

In this embodiment the entire load is carried by the central fuselage section as is also a pilot compartment 114. As is readily apparent from an examination of Figure 11, the pilot compartment 114 surmounts the wing and is therefore spaced substantially above the surface of the ground.

Inasmuch as on occasions it may be especially advantageous to carry the load entirely in removable pods, the embodiment of the invention disclosed in Figures 10 and 11 shows both a fore and aft platform upon which removable pods may be mounted. To make this possible the central fuselage 104 is built in the form of a platform 120 which extends throughout the entire length of the central fuselage section. This particular arrangement, shown most clearly in Figure 11, may likewise be employed with equal facility in the other forms of the invention herein disclosed and especially in the form of the invention described in detail in connection with Figures 1 through 5, inclusive, wherein the load-carrying fuselages are embodied in two separate sections on opposite sides of a central fuselage.

For connecting the platform to the wing there is provided a joining structure 121 of ample breadth as indicated in Figure 10 which joins the wing intermediate the wing portions 108 and 109 to which it is attached by conventional means.

As further illustrated in Figures 10 and 11 a removable cargo pod 122 is mounted on a forward extension 120' of the platform and a second removable cargo pod 123 is mounted on a rear extension 120''. Specific details of the mounting of these last named cargo pods have been omitted from Figure 11 in the interest of clarity but attention is directed again to Figures 5 through 8 which structure is readily adapted to and is incorporated in the form of the invention of Figures 10 and 11 with the same effect as in the first described form.

To further amplify the disclosure of the instant invention a third form is illustrated in Figures 12 and 13. In this form the arrangement and relationship of parts bears a close similarity to the arrangement and relationship of parts shown in Figures 10 and 11. To this extent there is provided a wing section comprising right and left outer portions 130 and 131 equipped with fuel tanks 132 and 133 at the tips. Engine fuselage or nacelle sections 134 and 135 house the power plants and at the rear ends thereof appears the empennage comprising right and left tail portions 136 and 137 joined by a horizontal central surface 138. A central fuselage section 139 is located between right and left intermediate portions 140 and 141 of the wing. Here again landing wheels 142 and 143 are located laterally with respect to the central fuselage section.

In this embodiment there is disclosed a platform 144 which, as indicated in Figure 13, extends fore and aft of the wing. In this particular embodiment a rear extension 144' is exposed for reception of a removable cargo pod 145 or superstructure unit. A forward extension 144'' is housed over by a canopy or shelter unit 146 permanently attached to the forward extension 144''. Within the canopy unit 146 is a pilot compartment 147 at the nose and behind the pilot compartment may be provided a bulk cargo compartment or space 148. The term canopy or shelter is here understood to mean a cover for cargo which may be temporary or removable but which in either event is not required to assume any portion of stress experienced by the plane structure whether on the ground or in flight.

Here again a joining structure 149 having a width equivalent to the width of the central fuselage section 139 joins the platform 144 to the wing intermediate the portions 140 and 141. A nose wheel 150 and a tail wheel 151 serve the purposes previously defined for wheels located as shown. A door 152 may be employed to provide access to the bulk cargo space. As has been previously indicated in connection with the arrangement for the mounting of removable cargo pods in connection with Figures 10 and 11 the removable cargo pod or superstructure unit 145 may be mounted upon and attached to the platform 144' in the same manner as described in Figures 5 through 8, inclusive. In this connection it should also be borne in mind that the door elements shown and described in connection with Figures 1 and 2 and heretofore identified by the reference characters 40, 41 and 43 may be employed with equal effect at the rear face of the joining structure 149 on occasions when the removable pod 145 has been removed for flight with the rear extension 144' exposed and unloaded.

It follows also that the same door elements may be employed in a similar manner in the form of the invention illustrated in Figures 10 and 11, namely, by application to opposite sides of the joining structure 121 there described.

As an illustration of the application of a permanent superstructure unit forming a bulk cargo space useful in all forms of the invention where the platform may be thus enclosed by a suitable shelter or canopy, attention is directed to Figures 14, 15 and 16. The structure there shown has been related to the form of the invention disclosed in Figures 12 and 13 as a matter of convenience and clarity in describing this feature and in conveying an understanding of the inventive concept.

In Figure 14 the platform disclosed is in fact the forward extension 144" of the platform 144. This may also be described as a floor structure consisting of an outer streamlined lower surface 160 and a flat upper surface or floor 161 upon which load, cargo or contents of the plane may directly rest. As has been previously disclosed the platform 144, including both forward and rearward extensions, is in actuality the fuselage. By this it is meant that the platform is so constructed, braced and strengthened that the platform alone is depended upon for all of the strength, rigidity and flexibility necessary for the plane in flight and at all times. It is the intention to so construct the platform that if need be any object whatsoever may be mounted upon the floor surface 161 attached thereto for safety's sake and the plane flown with the object mounted upon it even in the absence of a sheltering superstructure unit and even in the absence of any streamlined removable cargo pod.

In the interest of economy of weight and cost it is preferable to provide a canopy or shelter of a suitable sort over the platform but inasmuch as the shelter or canopy does not need to provide any strength or rigidity to the fuselage, the shelter or canopy may be made only sufficiently strong to resist wind pressure at customary speeds for which the plane is built and to resist the weather and elements. Moreover, the line of junction between the shelter or canopy and the platform need not be rigid nor of the type which would ordinarily be required to pass stress from the platform to the canopy. This junction may be flexible since its only function is to fasten the shelter or canopy down to the platform. In this respect there is a substantial similarity between the permanent shelter or superstructure unit illustrated in Figure 14 and the removable cargo pods described elsewhere in the specification. When using a permanent canopy or shelter it is advisable to employ a construction, illustrated in Figure 17, to allow for a take-up of deflection of the deck or platform which gets into the canopy skin and otherwise causes it to move or buckle, particularly at the top side of the canopy. Two such constructions or breathers are shown located on the permanent canopy in Figure 13 at the points 153 and 154. As more clearly shown in Figure 17 the breather includes a flexible section 155 between stiffeners 168 and adjacent a frame element 156.

In particular the canopy, shelter, or superstructure unit shown in Figures 14, 15 and 16 is constructed of forming stiffening frames or hoops 165, a sufficient number of which may be provided in order to lend support for a skin 166 of suitable thickness. The forming frames may, if desired, comprise hat sections 167 of the type shown in Figure 16. For connecting the forming frames there are shown stiffeners or longitudinal stringers 168 which may take the form of extruded L or angle sections 169 shown in cross-section in Figure 15. As there illustrated the hat sections 167 are provided with apertures 170 through which the stiffeners may pass. The skin 166 is applied to the outer surfaces of the forming frames and the stiffeners and attached thereto by conventional means well known in aircraft construction.

For convenience the platform 144 may be identified as a deck and the superstructure unit may be described as a roof or cover comprising lateral side wall elements joined to a top or roof, the precise cross-sectional shape of which is not important. The deck structure may be as illustrated in Figure 14 incorporating flanged bulkheads 175, stringers 176, and hat section stiffeners 177 at the bottom located in a recess 178. A corrugated panel 179 may supply a top and support a skin 180 and, where a canopy is employed, also a plywood cover 181.

For joining the superstructure unit to the platform the platform may be provided with T strips 171 permanently attached to the uppermost outer corner of the floor 161 so that one web 172 overlies the outer surface of the platform and another web 173 extends upwardly forming a flange along the outer extremity of the floor. The skin 166 may be attached to the webs 173 by means of rivets 174 or other suitable fastening. It is significant that the attachment need not be made directly to the framework of the superstructure unit embodied in the forming frames or stiffeners since there need be no transfer of stresses or strains from the superstructure unit to the platform.

By providing an aircraft structure of the type herein shown and described an airborne vehicle has been disclosed particularly adapted to the transfer of loads both in the form of bulk cargo and in the form of preloaded removable pods or receptacles. The plane of the invention, regardless of its form, including as it does a basic fuselage in the form of a platform or deck, can be flown with or without load and also with an unbalanced load, thus greatly facilitating the handling of cargo. Planes of the type described can be set upon airports at any location within the reach of ordinary motor transportation and preloaded pods or receptacles can be rolled up to the plane either upon their own rolling supports or by the use of conventional motorized transportation and there shifted into position upon the plane. When in position on the plane the removable pods are adapted to be firmly secured in place and have such form that they contribute to a minimization of wind resistance in flight but are without the necessity of supplying any rigidity or stress resistance to the plane as a whole. As noted the cargo-carrying platform are designed so as to form the bottom of the fuselage and therefore near the ground and well removed from the engines and pilot compartment. This arrangement greatly improves the handling of cargo during loading and unloading which operation is greatly facilitated by the presence of ample space into which conventional vehicles may approach so as to directly load and unload the contents of the vehicle into the plane without interference. In the arrangement shown the removable pods are completely interchangeable from one side to the other of a plane or from one plane to another and may be supplied in quantity and moreover carried to and from airports without the necessity of use of special transportation means. The removable pods may, moreover, be loaded in any manner and a less than full load may be accommodated as readily as a full load. Still further by providing a platform structure sufficient unto itself as a fuselage, a live load may be transported in bulk cargo space with the same facility as a dead load, the floor structure being designed with sufficient strength and rigidity to support a load concentration of any of the usual weights adapted to transportation by aircraft.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. An airplane comprising parallel laterally spaced fuselage sections, a wing spanning said sections, an empennage section joined to the wing, a structure including pilot cabin and an engine section joined to the wing, each said laterally spaced fuselage section comprising a central connecting portion attached at its upper part to and carried by the wing, a self-supporting relatively flat platform extending throughout the length of each fuselage section forward and aft of the wing, said platform being located at a level lower than the level of the wing and having an upwardly facing exposed portion extending forward of the wing, an individual pod on said platform, power means on each fuselage section engaging jointly the pod and the platform for moving said pod off and on said platform, and locking means on each laterally spaced fuselage section cooperable with said pod.

2. An airplane comprising parallel laterally spaced fuselage sections, a wing spanning said sections, an empennage section joined to the wing, a central nacelle including pilot cockpit and engine section joined to the wing, each said fuselage section comprising a central upwardly extending connecting portion attached to and carried by the wing, a self-supporting platform extending throughout the length of each fuselage section forward and aft of the wing, each said platform forming the bottom of said respective fuselage section and having an exposed portion extended outwardly away from one side of the wing, closure elements at the end of said exposed portion adjacent the wing comprising lateral doors and a top hatch cover having collapsed positions parallel to the wing and adapted to be extended to streamlined positions of common juncture at a location removed from the wing.

3. An airplane comprising parallel laterally spaced fuselage sections, a wing spanning said sections, an empennage section joining the wing, a central structure comprising a pilot cabin and an engine compartment joining the wing, and ground-engaging wheels on the fuselage sections, each said fuselage section comprising a central connecting portion attached to and carried in flight by the wing, a platform attached to a lower part of the connecting portion and extending fore and aft of the wing throughout the length of each said fuselage section at a level lower than the level of the wing, an individual pod on each said platform on one side of the wing having side surfaces conforming to the side surfaces of the respective lateral fuselage section and a bulk cargo shelter on each platform on the other side of the wing, power means on each fuselage section cooperable with the pod and the platform for moving said pod in endwise direction off and on said platform, locking means on each lateral fuselage cooperable with said pod, and a support on each said pod having a position adapted for contact with the ground wherein said pod is supported at an elevation corresponding to the elevation of the respective platform.

4. A cargo transport plane comprising parallel laterally spaced fuselage sections, a wing spanning said sections, a tail structure and a central fuselage section comprising a pilot cabin and an engine compartment joined to said fuselage sections, said lateral fuselage sections having retractable ground-engaging wheels mounted thereon, each section comprising an intermediate portion extending below and carried by the wing, a bulk cargo space in each section aft of the wing, a platform extending forward of the wing and forming the bottom of said intermediate portion and at a level lower than the level of the wing and an individual removable pod on the upper side of each said platform conforming in outline to the respective fuselage section, power means on each platform cooperable with the pod for moving said pod in endwise direction off and on said platform, locking means on each platform cooperable with said pod, and a retractable rolling support on each said pod having an extended position adapted for contact with the ground wherein said pod is supported at an elevation substantially the same as the elevation of the respective platform.

5. In a plane comprising a central fuselage section, a wing section, an empennage section and a pilot compartment, and twin engine fuselage sections on the wing sections on opposite sides of the central fuselage, said central fuselage comprising a platform extending transverse to the wing section, a joining structure comprising a connection between the platform and the wing section, said pilot compartment being mounted upon the joining structure, removable pods structurally independent of said fuselage mounted respectively on said platform with adjacent ends adjoining the joining structure, and locking means between said pods and said platforms.

6. In a plane comprising a central fuselage section, a wing section, an empennage section and a pilot compartment, and twin engine fuselage sections on the wing sections on opposite sides of the central fuselage section, said empennage section being attached to the rear of said engine fuselage sections, said central fuselage section comprising a platform extending below and fore and aft of the wing section, a joining structure intermediate the ends of said platform comprising a connection between the platform and the wing section, said pilot compartment being mounted upon the joining structure adjacent the area of the wing section and extending over said platform, and cargo pods structurally independent of said central fuselage mounted respectively on said platforms with adjacent ends adjoining the joining structure and the pilot compartment, locking means between said pods and said platforms and means cooperable respectively with the platforms and said pods adapted to move said pods endwise off and on said platforms.

7. In a cargo plane having a central fuselage section, a wing section thereon, an empennage section and a pilot compartment the combination of twin engine fuselage sections on the wing section and having said empennage section joined thereto, said central fuselage section comprising a cargo-supporting floor structure of width substantially greater than the depth thereof extending fore and aft of the wing section, a joining structure between the wing section and the floor structure, said pilot compartment being mounted on the floor structure forward of the wing section, and cargo sheltering canopy units surmounting the floor structure both fore and aft of the wing section and secured to the side edges of said floor structure and the joining structure, said canopy unit aft of said wing section being removable from the floor structure for replacement by other removable canopy units.

8. In a cargo plane having a fuselage section, a wing section thereon, an empennage section and a pilot compartment, the combination of twin engine sections on the wing sections, said fuselage section comprising a cargo-supporting platform structure of width substantially greater than the depth thereof extending fore and aft of the wing section, a joining structure between the wing section and the platform structure, said pilot compartment being mounted on the platform structure forward of the wing section, a cargo sheltering canopy unit surmounting the floor structure forward of the wing section and permanently secured to the side edges of said floor structure and the joining structure, and a cargo sheltering canopy unit aft of said wing section comprising a floor and a cover attached thereto, said last identified superstructure unit being removable from the platform structure for replacement by other removable superstructure units.

9. A transport plane comprising a wing section, an empennage section, at least one fuselage section for cargo and at least one fuselage section for motive power, and a landing gear, said fuselage section for cargo comprising a structurally independent platform extending fore and aft of the wing forming the support for a load carried thereon, a supporting connection between the platform and the wing, and a non-stress bearing closed shelter over the platform comprising roof and side wall elements, said roof and side wall elements having bottom edges adjoining the platform and secured thereto and having a streamline of junction with adjoining portions of the fuselage.

10. A transport plane comprising a wing section, an empennage section, at least one fuselage section for load, at least one fuselage section for motive power, and a landing gear, said fuselage section for load comprising a structurally independent platform extending fore and aft of the wing forming the entire support for the load thereon and a supporting structure between the platform and the wing, and a permanent non-stress bearing shelter over that portion of the platform forward of the wing comprising roof and side wall elements joined at the bottom edges to the platform, a removable shelter comprising bottom and cover elements on that portion of the platform aft of the wing, said bottom element having a releasable anchorage to the platform, said shelters having a smooth junction with adjoining portions of the fuselage.

11. A transport plane comprising a wing section, an empennage section, at least one fuselage section for load, at least one nacelle section for motive power, and a landing gear, said fuselage section for load comprising a structurally independent platform extending fore and aft of the wing forming the entire support for the load thereon and a supporting structure between the platform and the wing, and a non-stress bearing canopy over the platform comprising roof and side wall elements including transverse stiffening frames, longitudinal stringers secured thereto and a skin stretched over said frames and stringers, upward extending flanges at the edges of the platform and means adapted to secure the skin forming the canopy to the flanges, said canopy having a flexible closure at the front and rear and a smooth line of junction between the canopy and the fuselage.

12. A transport plane comprising a wing section, an empennage section, at least one fuselage section for load, at least one fuselage section for motive power, and a landing gear, said fuselage section for load comprising a structurally independent platform extending fore and aft of the wing forming the entire support for the load thereon and a supporting structure between the platform and the wing, and a non-stress bearing shelter over the platform comprising roof and side wall elements comprising transverse stiffening frames, longitudinal stringers secured thereto and a skin stretched over said frames and stringers, upward extending flanges at the edges of the platform and means securing the skin forming the shelter to the flanges, said shelter having a flexible closure at the front and rear and a smooth line of junction between the shelter and the fuselage.

13. An airplane structure comprising a wing, a tail structure joined thereto, at least one fuselage for a transport load joined to the wing and at least one fuselage for an engine joined to the wing, a pilot compartment on one of said fuselages and landing wheels mounted below the wing in supporting relation to said fuselages, said fuselage for the transport load comprising a connecting portion intermediate the ends thereof joining the wing, a platform attached to said connecting portion at an elevation spaced a substantial distance below the elevation of the wing and within the plane of the landing wheels and extending endwise transversely to and beyond the wing, said platforms each having an end section extending longitudinally outwardly and away from the wing and free at all times from engagement with said connecting portion, and a shelter for the transport load adapted to be secured in position upon said platform having a longitudinal configuration conforming to the longitudinal configuration of the respective fuselage section, said shelter when in secured position enclosing the free end section of the platform, means engaging the shelter and the platform adapted to move said shelter off and on said platform, and releasable locking means engaging the shelter and the platform adapted to anchor said shelter on the platform.

14. A cargo airplane comprising a wing, a tail structure joined thereto, at least one fuselage respectively for cargo joined to the wing and at least one fuselage for an engine joined to the wing, a pilot compartment on one of said fuselages, and landing gear on said airplane, said fuselage for cargo comprising a connecting portion intermediate the ends thereof extending upwardly and joining and supported in flight by the wing, a platform attached to the lower part of said connecting portion at an elevation below and spaced from the underside of said wing, said platform extending endwise transversely to and beyond the wing, said platform having an upwardly exposed pod-receiving area thereon located below the wing, an individual cargo pod adapted to be positioned on said area of the platform having a longitudinal configuration conforming to the longitudinal configuration of the respective fuselage enclosing the pod-receiving area and forming an end of the fuselage when in place, power means engaging the pod and the platform adapted to move said pod off and on said platform, releasable locking means engaging the pod and the platform adapted to anchor said pod on the platform and a support on the pod adapted to engage the ground when the pod is removed from said platform.

15. An airplane comprising a wing, a tail structure joined to the wing, at least one fuselage for cargo joined to the wing and at least one fuselage for an engine joined to the wing, and a pilot compartment on one of said fuselages all in fixed flying position on the airplane, said fuselage for cargo comprising a mid-portion extending upwardly therefrom and supported in flight by the wing, a structurally complete platform attached to said mid-portion at an elevation below and spaced from the elevation of the wing, said platform having an upwardly exposed cargo area and extending endwise transversely to the wing, an individual cargo pod positioned above and supported on said platform having a configuration conforming to the configuration of the respective fuselage section, said pod when in position on the platform being located substantially below the wing and forming a free streamlined end for the platform, power means on the fuselage for cargo engaging the pod and the platform adapted to move said pod off and on said platform, releasable locking means engaging the pod and the platform adapted to anchor said pod on the platform and a support on the pod adapted to engage the ground when the pod is removed from said platform for replacement with another pod of corresponding configuration.

HARLAN D. FOWLER.

References Cited in the file of this patent

UNITED STATES PATENTS

| Number | Name | Date |
|---|---|---|
| 1,916,092 | Bleriot | June 27, 1933 |
| 2,368,288 | Couse et al. | Jan. 30, 1945 |
| 2,388,380 | Bathurst | Nov. 6, 1945 |
| 2,441,913 | Taylor | May 18, 1948 |
| 2,463,346 | Akerman | Mar. 1, 1949 |
| 2,472,947 | Hlobil | June 14, 1949 |
| 2,476,538 | Fowler | July 19, 1949 |
| 2,480,279 | Belanger et al. | Aug. 30, 1949 |
| 2,553,207 | Peltier | May 15, 1951 |